March 16, 1943.  G. M. ROSE, JR  2,314,105

METHOD OF MAKING HEADERS

Filed Feb. 28, 1941

INVENTOR.
GEORGE M. ROSE, JR.
BY Charles McClair
ATTORNEY.

Patented Mar. 16, 1943

2,314,105

UNITED STATES PATENT OFFICE 2,314,105

METHOD OF MAKING HEADERS

George M. Rose, Jr., East Orange, N. J., assignor to Radio Corporation of America, a corporation of Delaware Application February 28, 1941, Serial No. 381,017

1 Claim. (Cl. 29—148)

My invention relates to the method of making headers such as in the metal envelopes of radio tubes.

In joining two sheet metal members it is usual to emboss or otherwise provide beads or projections on one of the sheet members and to press the other member against the projections and pass welding current between the pieces through the projections. This projection localizes heating caused by the welding current and makes for more uniform and stronger welded junctions. When the sheet metal pieces to be joined are thin, embossings in the sheet metal are correspondingly thin and experience has shown that considerable metal splashes from the weld region and produces generally imperfect welds. Uniformity and continuity of line welds are particularly important in the hermetic seals of metal envelopes. Failure of welds made to projections drawn from thin sheet metal stock is apparently caused by the mechanical weakness of the projections and because of the thinness and small amount of metal in the projections. The projection will melt, volatilize, and splash with heavy electrode pressures and large welding currents.

The characteristic features of my invention are defined in the appended claim and one preferred embodiment thereof is described in the following specification and shown in the accompanying drawing in which:

Figure 1:
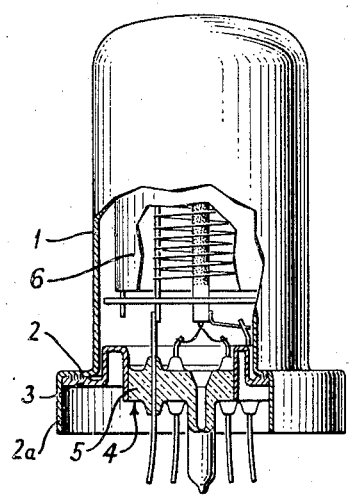
Figure 1 shows a sealed metal envelope, partly in section, made according to my invention.
Figure 7:
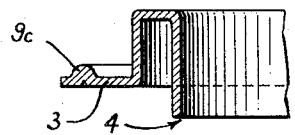
Figure 7 shows the sheet metal member of my improved welding method formed into a header for the envelope of the radio tube of Figure 1, and, Figure 8 shows in sectioned detail a hermetic welded joint made according to my invention.
Figure 6:
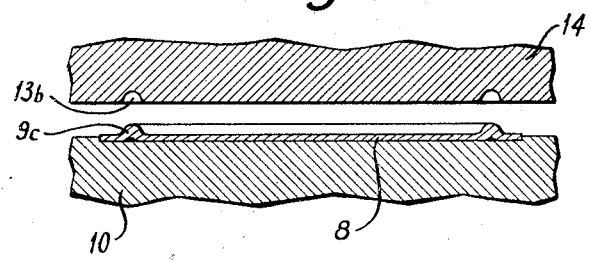

The radio tube shown in Figure 1, and chosen for illustrating one application of my novel welding method, comprises the usual sheet metal shell 1 with an outwardly extending radial flange 2 welded to the flat ring 3 of the header 4. The shell and flange may, if desired, be drawn with a skirt 2a along the outer edge of the flange. The metal ring 3 is hermetically joined to a glass button 5 in which is sealed the lead-in conductors for the electrodes 6 of the tube and preferably the ring is joined to the glass button through a metal annulus, U-shaped in cross section, to isolate the glass-to-metal seal from the thermal and mechanical shock caused by welding the shell flange and header ring. The header ring is embossed as shown in Figure 7 with an annular bead 9c intermediate the peripheries of the ring and concentric with the ring. It is usual in practice to press a welding bead in sheet metal by embossing tools which draw the metal upwardly from the face of the ring. The metal in the bead in such practice is thinned by the drawing operation and it is probable the metal of the bead is considerably weakened so that pressure applied to the bead by welding electrodes collapses the bead, reduces the contact welding resistance and causes the imperfect welds.

Figure 2:
Figures 2, 3, 4, 5 and 6 show successive steps in my improved welding method of preparing one of the sheet metal members for welding.
Figure 3:
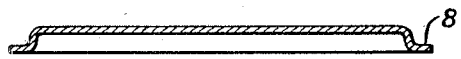
Figure 4:
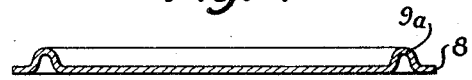
Figure 5:
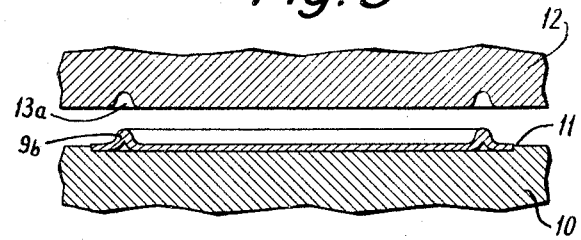

The sheet metal member according to my invention is provided with a projection or bead that is mechanically strong and will not collapse under the welding electrodes. The bead according to my invention is practically solid, resembling the coin type of embossing, as distinguished from the thin walled drawn bead usually made for projection welding. An enlarged hollow embossed bead is drawn from one of the sheet metal members to be joined, the sheet preferably being drawn inwardly from its edges so that the metal of the embossed portion is not materially thinned. Then the enlarged hollow bead is swaged while constricting the reverse flow of metal from the embossed region, so that a substantially solid bead remains on the sheet. To make a sheet metal member with welding projections for the header of a hermetically sealed envelope, for example, I start with a round disc of sheet metal 8, Figure 2, of the desired thickness and of a diameter slightly larger than the finished header. The first step in my novel method is to draw the disc into a shallow saucer, Figure 3. This drawing operation pulls metal inwardly from the edge of the disc, reducing its diameter. Then the bottom of the saucer is drawn in the opposite direction as shown in Figure 4 to bring the central portion of the disc back into its original plane with the periphery of the disc and to leave an enlarged hollow and round bead 9a concentric with the periphery of the disc. The second or reverse drawing may be done by a simple flat faced punch smaller in diameter than the punch used for the first drawing. Alternatively, the embossing may be done with an oversized embossing tool. The disc, now reduced in diameter, is placed on a female backing holder 10 and within the flange 11 high enough to prevent outward flow of metal in the blank and to definitely prevent enlargement of the diameter of the blank. Coining die 12 with a circular beading groove 13a now descends upon the disc and compresses the bead, shown at 9b, to about one-half the height of the bead at 9a. A second blow upon the bead from coining die 14 with a smaller beading groove 13b still further compresses the bead as shown at 9c. Because of the constriction at the edge of the disc, the metal cannot flow away from the bead. If desired, a third blow from a coining die may completely level the metal on the backing die 10, and produce a solid coin embossing.

Figure 8:
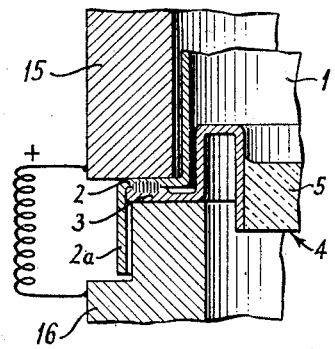

Sheet metal member 8 is now ready to be welded by pressing the bead 9c against the metal member to which it is to be joined and passing welding current through the bead. Because the bead is of solid metal, as distinguished from a hollow embossing, the bead will not collapse between the welding electrodes and will uniformly heat during welding. In the specific example illustrated and described, the disc 8 may be centrally blanked out as shown in Figure 7 with a ring U-shaped in cross section inside the beaded periphery of the disc and the inner cylinder of the ring sealed to the glass button header 5 of of a radio tube. The electrode assembly 6 is connected to the ends of lead-in conductors in the glass button and telescoped into the shell 1 of the envelope, bringing the beaded ring against the shell flange 2. Welding electrodes 15 and 16 of the open cylinder type are then telescoped over the shell and into the header skirt as shown in Figure 8, the necessary pressure is applied and the welding current turned on. The bead melts and collapses, hermetically sealing in a long annular weld line the shell flange and header ring. Good results have been obtained in making uniform header-to-shell welds in radio tubes having an iron shell of a diameter of about one inch and a shell and header wall thickness of .016 to .020", the welding being made with an electrode pressure of more than 1400 pounds and a welding current of about 60,000 amperes flowing for two to three cycles of a commercial power source of 60 cycles per second alternating current.

It is my belief that the uniform hermetic welds may be attributed to the solid bead 9c. The high amplitude short time welding current and high mechanical electrode pressure necessary to fuse and weld the parts before oxidation of the metal sets in, require a bead that will not collapse at the beginning of the heating and hence will prevent short circuiting of the welding electrodes through the extended flat registering faces of the shell flange and header ring. My solid bead supports the electrodes and permits gradual heating and welding. Many of the failures with the conventional drawn bead were apparently caused by premature liquification of the hollow and relatively light bead and arcing between the relatively cool shell flange and pool of molten metal at the bead. This premature melting of the conventional hollow bead is indicated by excessive splashing of molten metal from the welded junction and by imperfect hermetic seals.

My improved projection welding is less expensive in manufacture because of the simple dies used in forming the bead. My solid bead is made with relatively low die pressures compared to the die pressures necessary for raising a bead from solid metal by the conventional coin embossing methods. My invention provides uniform and inexpensive hermetic seals along an extended line of contact between two sheet metal parts.

I claim:

The method of making a header for a vacuum envelope, comprising drawing a flat metal disc into a shallow saucer, then reversely drawing the central portion of the formed saucer to leave a circular bead concentric with the edge of the disc, then swaging the said bead while holding the periphery of the disc against expansion in a radial direction.

GEORGE M. ROSE, Jr.